United States Patent Office 3,557,027
Patented Jan. 19, 1971

3,557,027
NOVEL POLYCARBOXYLIC PREPOLYMERIC MATERIALS AND POLYMERS THEREOF
Harold E. Marsh, Jr., La Canada, Calif., and John J. Hutchison, Flushing, N.Y., assignors, by mesne assignments, to the United States of America as represented by the administrator of the National Aeronautics and Space Administration
No Drawing. Filed Aug. 30, 1968, Ser. No. 756,381
Int. Cl. C08g 20/00, 20/26, 53/08
U.S. Cl. 260—2.5                    12 Claims

ABSTRACT OF THE DISCLOSURE

Novel prepolymers and self-foaming, high-temperature resistant polymers thereof are disclosed. The polymers are prepared by the reaction of a relatively high molecular-weight essentially saturated aliphatic hydrocarbon polycarboxylic terminated prepolymer and a polyisocyanate, preferably an aliphatic isocyanate such as hexamethylene-diisocyanate. Carbon dioxide is evolved as a result of the reaction and a uniform cell structure product is formed. Cell size can be controlled by the addition of non-gas evolving cross-linking agents such as polyols or diaziridines. The carboxyl-terminated material is preferably a prepolymer having a star-shaped configuration, for example, dimers or trimers of unsaturated $C_{12}$ to $C_{24}$ fatty acids or polyesters thereof. In an example of the latter prepolymer, three moles of dimerized linoleic acid and two moles of 1,10-decane diol yields a carboxyl-terminated polyester suitable for use in the polymerization reaction of the invention. The presence of trimer acid insures a more tough product.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION (1) Field of the invention

This invention relates to novel polycarboxylic prepolymer materials and to a class of polymers prepared by condensing said materials with a polyisocyanate. The invention also relates to particular carboxyl-terminated polyester prepolymers and to foams produced from said prepolymers and said materials.

(2) Description of the prior art

There is considerable interest and potential need and uses for low-temperature curing binder systems which will produce polymers having both high thermal stability and good mechanical properties at low temperature.

Condensation polymers generally satisfy the criteria of low-temperature curing but the congestion that can occur around the branch point of a small multi-functional molecule can hinder effective total curing. Moreover, many times the multi-functional cross-linking agents are poorly soluble in the curing system, and in many systems, unavoidable side reactions prevent the formation of suitable polymers.

The condensation of amines and carboxyl moieties to yield chain extending linkages has no serious side reactions. However, it is essentially a two-step process as illustrated below:

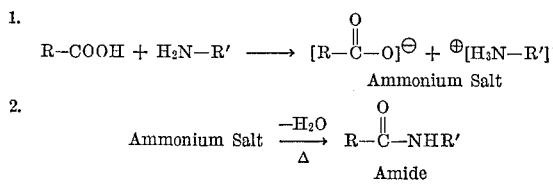

When carboxyl-terminated hydrocarbons are reacted with diamines in solution or in bulk, the insoluble polyammonium salt is formed rapidly. This material is difficult to work with and requires heating to gradually evolve water to yield the polyamide. Coupling of carboxyl and amine groups under mild conditions has been reported using N,N'-dicyclohexylcarbodiimide to split out water. However, the intractability of the polyammonium salt has also diminished the attractiveness of this system. Furthermore, the existence of these ammonium linkages would certainly effect the point of gelation in a cross-linked polyamide.

SUMMARY OF THE INVENTION

In accordance with the invention, a material which can withstand elevated temperature without significant decomposition is readily prepared at room temperature by the reaction of a relatively high-molecular-weight aliphatic hydrocarbon polycarboxylic-terminated prepolymer and a polyisocyanate. The reaction is believed to proceed to form amide chain extending linkages according to the following reaction:

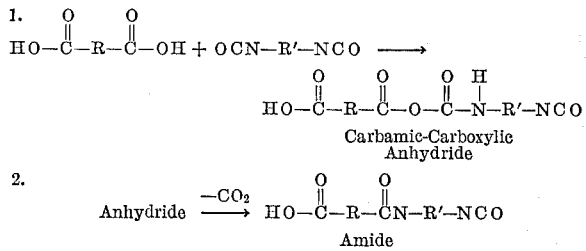

The use of a tri-functional acid or a tri-functional isocyanate will produce a cross-linked network which will render the product more elastomeric. Chain extension or cross-linking may also be effected with other reagents such as polyols or polyimides as will be described. The active hydrogen on the amide also presents a site for further reaction and cross-linking by excess polyisocyanate.

DESCRIPTION OF THE PREFERRED EMBODIMENTS (1) The carboxyl-terminated material The carboxyl-terminated material is preferably a prepolymer having a star-shaped configuration. A star-shaped prepolymer is defined according to the invention as an essentially aliphatic branch chain hydrocarbon product having a central hydrocarbon structure to which is joined at least two and preferably three pendant hydrocarbon chains and at least two or three hydrocarbon chains terminated with a carboxyl group. The pendant hydrocarbon chains preferably contain at least three or four carbon atoms each and the molecular weight of the material is preferably from about 500 to 5000.

Within this class of materials are carboxyl-terminated or modified low polymers such as polybutadienes or polybutylenes and a class of polycarboxylic materials prepared by dimerization and trimerization at mid-molecule of unsaturated long chain $C_{12}$ to $C_{24}$ fatty acids or reaction products thereof such as polyesters. These later materials have relatively sharply defined molecular weights, and their carboxyl functionality is very close to two or three, depending on whether the product is a dimer or trimer. The dimer and trimer acids have the following approximate structure:

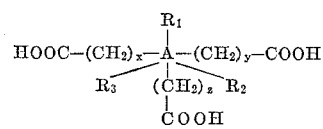

where $R_1$, $R_2$ and $R_3$ are hydrocarbon side chains containing preferably at least four carbon atoms and $x$, $y$ and $z$ are integers of a variable value such that the total number of carbon atoms in the molecule is from about 30 to 70. The structure of the dimer or trimer is essentially that of a long chain di- or tri-basic acid with two or more side chains near the center, A, of the molecules. The structure of the center, A, has not been fully determined and may contain a ring configuration.

A component of a $C_{36}$ dimer acid has been identified as having the following structure:

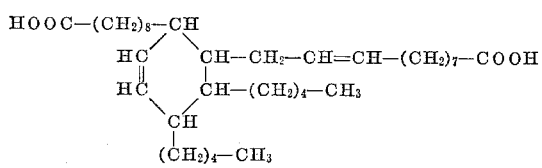

It can be seen that there may be some residual unsaturation in the chains and the formation of unsaturated cyclic structures is possible. The residual unsaturation is preferably reduced to as low a value as possible and is preferably reduced to an Iodine Number of less than two and more preferably less than 0.5 by conventional hydrogenation. This has been found to improve the behavior of the product at low and high temperatures. High pressure hydrogen and a palladium catalyst have been found suitable to reduce the residual unsaturation.

A typical tri-functional acid is distributed by Emery Industries and is identified as Empol 1040 Trimer Acid. This material is produced by polymerization of $C_{18}$ unsaturated fatty acids. The polymerized material is a viscous liquid soluble in alcohol, ketones, and ethers and is partially soluble in hydrocarbons. Chemically the trimer acid is a $C_{54}$ tri-basic acid with a molecular weight of about 845 having an Acid Value of about 183 to 191, a Saponification Value of about 192 to 200 and viscosity at 50° C. of about 11,300 centipoise. The unsaturation of the trimer acid corresponds to an Iodine Number of about 10 to about 50 which is reduced by hydrogen and palladium to an Iodine Number of about 0.4 according to the invention.

Telagen-S, a linear aliphatic hydrocarbon polybutadiene prepolymer with terminal carboxyl groups, is distributed by General Tire and Rubber Co. The molecular weight of this material is about 2000 and the equivalent weight is about 800 to 1250 based on a functional group assay of about 0.8 to 1.20 milliequivalents of carboxyl per gram of prepolymer. This prepolymer material was partially hydrogenated with a palladium catalyst in hexane solution under hydrogen to an Iodine Number as low as 1.6. A typical Telagen-S unsaturated prepolymer has its double bonds distributed approximately as 27% tran, 40% cis, and 33% vinyl linkages. Quite low Iodine Numbers are required before substantially all the pendant vinyl groups are hydrogenated.

The dimer acids of linoleic acid have a molecular weight of about 565. Fluidity is maintained, despite this molecular weight, by the branched structure. The molecular weight can be increased substantially by formation of a prepolymer. For example, three molecules of the dimer acid may be linked using two molecules of a di-functional alcohol to form a polyester. Utilization of high molecular weight diols, such as those containing 8 to 50 carbon atoms or more, are preferred to minimize the proportion of oxygen containing ester linkages in the binder.

The reaction of three moles of a dimerized linoleic acid prepolymer and two moles of 1,10-decane diol in refluxing xylene with 0.1% by weight of p-toluenesulfonic acid catalyst yields a carboxyl-terminated polyester with a theoretical molecular weight of 1972. The dimer acid prepolymer was hydrogenated by standard methods to a residual unsaturation content represented by an Iodine Number of about 0.4. This polyester material has a lower viscosity than saturated polybutadiene carboxyl-terminated materials of comparable molecular weight. Hydrogenation was performed at about 110 to 140° C. and at 1800 to 2000 p.s.i. hydrogen pressure utilizing a hydrocarbon solvent and a catalyst composed of 5% palladium on charcoal. Other aliphatic diols, such as those with some branching in the main aliphatic chain of the hydrocarbon, may be utilized.

(2) The isocyanate materials

The polyisocyanate starting material may be an aliphatic or an aromatic diisocyanate. There was evidence of a greater degree of curing when the aliphatic diisocyanates were utilized. Typical aromatic diisocyanates are toluenediisocyanate while exemplary aliphatic diisocyanates are isocyanates containing four to twenty carbon atoms such as pentamethylenediisocyanate, hexamethylenediisocyanate and octadecylenediisocyanate.

(3) Other additives

Various materials which act as modifiers, catalysts or accelerators for the curing reaction may be present in small amounts. The addition of an amine catalyst in the range of 0.1 to 5% and preferably 0.5 to 1.0% by weight substantially increases the curing rate. It has been found that an excess of catalyst is harmful to foam structure during curing. A surface active agent such as a dimethylpolysiloxane silicone oil is found to improve the formation and make uniform the cell size in the final foam. The siloxanes are found to be soluble in the reaction mixture, but when used in amounts greater than 1% by weight, the siloxane is found to remain as an oily film on the cured product.

The amount of gas and thus foam density can be regulated by adding chain extending reagents which react with the carboxyl or isocyanate groups to form chain extending or cross-linkages with no gaseous elimination. Examples of such products are multifunctional aziridines which produce ester linkages and multifunctional alcohols which produce urethane linkages. The aziridine nucleus may be aliphatic, aromatic, heterocyclic or may be inorganic in nature.

Exemplary materials are listed with their structures in the following table:

TABLE

| | |
|---|---|
| MAPO [1] | CH₃—CH, N—P—N, structure with CH₂ groups and CH—CH₃ |
| HX 740 (3M) | CH₂, N—C—C—(CH₂)₃—C—N, CH₂ with CH₃ groups |
| HX 868 (3M) | CH₂—CH—CH₃, N, C=O, benzene ring with CH₃—CH, N—C—O—C—N, CH—CH₃ structure |
| HX 874 (3M) | CH₂, N—C, C—N, CH₂; C₂H₅—CH, N, N, CH—C₂H₅; C, N, CH₂—CH—C₂H₅ |

[1] Interchemical Corp.

(4) Preparation of foamed resins

The polyfunctional acid, polyisocyanate, catalyst and surface active agent are charged to a reaction zone in the liquid state and agitated until a uniform mixture is obtained. After gas evolution begins, the reaction mixture is allowed to stand for several hours and an expanding foamed mass is produced. The foam mixture is then cured by heating the foamed mass to a temperature of at least 65° C. and preferably from at about 85 to 95° C. for several hours. Though the reactants foam without external heating at room temperature, faster foaming can be effected by slightly heating the mixture to temperatures of about 40 to 50° C. Increasing the final cured temperature or cure time were not found to substantially change the properties of the product.

Though foams can be prepared from di-functional carboxylic acid prepolymers, it has been found necessary to utilize tri-functional acids to impart toughness to the final product. As the proportion of trimer acid is increased, an increasing quantity of foam is formed in the early stages of the reaction and the hardness and brittleness of the foam increases with increasing tri-functional content. In general, rather high proportions of the trimer acid are required to give moderately tough flexible foams; the required ratio of equivalents of carboxyl from the trimer acid to total carboxyl equivalents being equal to about 0.8 to 0.9.

The carboxyl content per gram of trimer acid is fairly high and therefore the carbon dioxide evolution is more than necessary for foam production. As discussed previously, gas evolution can be controlled with the use of non-gas evolving chain extending agents. The hydroxyl-terminated materials were not very effective, apparently because of the difference between the hydroxyl-isocyanate and carboxyl-isocyanate reaction rates. Much better results were achieved with the diaziridines such as HX 740. Foam density and toughness increased as the ratio of aziridine to equivalents of carboxyl was increased through a range of 0.2 to 0.8. The ratio of isocyanate equivalents to carboxyl equivalents correspondingly decreased from 0.8 to 0.2. Use of an excess of isocyanate or aziridine with respect to carboxyl was not found to effect an improvement in properties.

The following examples are offered by way of illustration only and are not intended in any way to limit the invention.

EXAMPLE I.—Saturated Telagen-S (4.0 grams or 0.0028 equivalent) having an Iodine Number of 1.6 and hexamethylene diisocyanate (0.329 gram or 0.004 equivalent) were mixed by hand in a beaker with 0.025 gram of triethylenediamine and one drop of DC–200 silicone oil. Foaming was only moderate after the first hour. The mixture was allowed to stand overnight at room temperature, and then cured in an oven at 88° C. for 40 hours. A stable, flexible foam was obtained with somewhat uneven cells. When the reaction was repeated with unsaturated carboxyl-terminated Telagen-S, the product formed was clearly inferior to the saturated product as evidenced by the collapse of the foam at a curing temperature of 100° C. and by weakness even at room temperature.

Example II.—Saturated Telagen-S (4.0 grams or 0.0028 equivalent), saturated Trimer Acid (7.35 grams or 0.0252 equivalent) having an Iodine Number of about 0.4 and hexamethylene diisocyanate (2.35 grams or 0.0280 equivalent) were mixed by hand in a beaker with a 0.08 gram of triethylenediamine, and one drop of DC–200 silicone oil (dimethylpolysiloxane). After a few minutes, foaming was initiated at room temperature and the mixture was allowed to stand for twelve hours at this temperature. The foam was further cured in an oven at 88° C. for ten hours and finally at 74° C. for 56 hours. The cured foam was stable, tough and fairly flexible, having a large cellular structure.

The product withstood 40 hours of heating at about 120° C. with only minimal darkening. The lower solubility in hexane indicated a higher degree of cross-linking than the product of Example I.

Example III.—Saturated Telagen-S (4.0 grams or 0.0028 equivalent), saturated Trimer Acid (7.35 grams or 0.0252 equivalent, and hexamethylene diisocyanate (1.18 grams or 0.014 equivalent) were mixed by hand in a beaker with 0.08 gram of triethylenediamine and a drop of silicone oil (DC–200).

To this was added the diaziridine, HX 740 (1.76 grams or 0.014 equivalent). The mixture immediately foamed without external heating. After standing overnight at room temperature, the mixture was cured at 85° C. for 24 hours. A tough, stable foam resulted, whose low solubility in hexane indicated a high degree of cross-linking. In further experiments, it was determined that foam density and toughness increased as the ratio of equivalents of aziridine to equivalents of carboxyl containing prepolymer was increased through a range of 0.2 to 0.8. With aziridines as components, there was sufficient heat evolution from the aziridine-carboxyl-isocyanate reactions to bring the center of a 1.5 inch diameter foam to about 45° C. for a period of at least ten minutes after reaction was initiated.

The foams prepared as in Examples I to III, above, had foam densities between 0.13 and 0.28 gram per cc. and fairly uniform cell structure. Typical products withstood periods of heating of 90 hours at 120° C. with only minimal darkening. Heat stability of some products at 130 to 135° C. was also noted.

The dimer acid suffers from having a high carboxyl content per gram and also in having a low molecular weight. However, as discussed, these can be polymerized into low molecular weight prepolymers which are carboxyl-terminated. Examples of preparation of a dimer acid polyester and its use to produce foams according to the invention follow.

Example IV.—Empol 1010 grade of dimerized linoleic acid (Emery Industries, Cincinnati, Ohio) was hydrogenated until the Iodine Number of the product was about 0.4 or less. Hydrogenation was conducted at about 110 to 140° C. and 1800 to 2000 p.s.i. hydrogen utilizing a hydrocarbon solvent and a palladium on charcoal catalyst. A quantity 1695 grams (3 moles) of the hydrogenated dimer acid and 348.5 (2 moles) of the high molecular weight diol, 1,10-decanediol were mixed with 0.1% by weight of p-toluene sulfonic acid catalyst and refluxed for about one week at about 140° C. in boiling xylene hydrocarbon. Water that was formed as a by-product was removed as an azeotrope. On removal of the solvent and on cooling, a viscous liquid remained which was analyzed for carboxyl content by conventional methods. Analytical data indicated a molecular weight of about 1970 and vapor phase osmometry analysis with the polymer dissolved in methylethylketone indicated a molecular weight above 1500. Viscosity determination carried out with a multispeed Brookfield viscometer in a 25° C. constant temperature bath indicated a viscosity at this temperature of 163.0 poise. This compares to 50.8 poise for the hyrogenated dimer acid starting material. This viscosity is considerably lower than the 400 poise viscosity level of a saturated Telagen-S prepolymer material with a comparable molecular weight.

A prepolymer penetration test indicated a penetration temperature of about −52° C. Modulus curves obtained with a Gehman torsion tester under ASTM standard procedure 01053–61 indicated that the product is amorphous, passing from the glassy to the liquid state over a very narrow temperature range with a very low degree of crystallinity. The product very nearly approaches the ideal of di-functionality. The available Telagen-S materials have approximately ¼ of their chains with one nonfunctional end. Therefore, the final cured polymer network with Telagen-S is much weaker.

Example V.—Saturated dimer acid polyester (2.0 grams or 0.00193 equivalent), saturated trimer acid (5.06 grams or 0.01737 equivalent) and hexamethylene diisocyanate (0.162 gram or 0.00193 equivalent) were mixed by hand in a beaker with 0.047 gram triethylenediamine and a drop of DC–200 silicone oil. To this mixture was added Diaziridine HX 740 (2.19 grams or 0.01737 equivalent). The mixture foamed without external heating and after standing overnight at room temperature, was cured at 85° C. for 24 hours. A flexible, spongy, tough foam was obtained with a fairly small but uniform cell structure. Typical products withstood long periods of heating at 120 to 135° C.

The foams produced according to the invention exhibit good heat stability and a fairly uniform cell structure. Satisfactory heat resistance has been achieved for sterilization temperatures of 120 to 135° C. currently specified for aerospace vehicle and component sterilization. Furthermore, the reactants provide a source of gas, thus obviating the need for separate foaming agents. The foaming and curing are carried out at room temperature without external application of heat. The invention makes it possible to form a variety of foams ranging from hard brittle materials to soft elastomeric or rubbery materials by merely reducing the ratio of tri-functional carboxylic prepolymer to the di-functional carboxylic prepolymer material.

The foams of the invention were successfully tested for use as liners for solid propellant motors. These elastomeric foams which can withstand elevated temperatures without decomposition or loss of mechanical properties will also find many commercial uses. For example, these foams will find use as heat resistant insulation, compressible gasket material, sound insulation material, spongelike paint applicators, floor buffing brushes and the like.

The polymer products of the invention may also advantageously be utilized to form dense compression molded products or to form coatings. The intermediate material obtained before final curing can be ground into a powder which can be compression molded into hard, dense, rigid and strong articles of a desired shape. The intermediate product may also be dissolved in solvent or the final cured products that are soluble in hexane can be formulated into coating compositions and applied and cured to high temperature resistant finishes.

It is to be understood that the foregoing relates only to preferred embodiments of the invention and that numerous substitutions, alterations and modifications are possible, all without departing from the spirit and scope of the invention as defined in the following claims.

What is claimed is:
1. A cellular composition comprising the cured reaction product of:
   (A) an organic polyisocyanate selected from the group consisting of aromatic polyisocyanates and aliphatic polyisocyanates; and
   (B) an aliphatic polycarboxylic acid material having a molecular weight from 500 to 5,000 and an Iodine Number of less than about 2 selected from the group consisting of (i) saturated dimers of fatty acids having 12 to 24 carbon atoms, (ii) saturated trimers of fatty acids having 12 to 24 carbon atoms, and (iii) carboxyl terminated polyesters prepared by reacting (a) an organic diol having 4 to 50 carbon atoms with (b) a member selected from the group consisting of said dimers, said trimers, or mixtures of said dimers and said trimers.

2. A composition according to claim 1 in which said polyisocyanate is an aliphatic diisocyanate containing from 4 to 20 carbon atoms.

3. A composition according to claim 2 in which said diisocyanate is hexamethylenediisocyanate.

4. A composition according to claim 1 in which said polycarboxylic acid material is a saturated trimer of a $C_{18}$ unsaturated acid, said trimer having an Iodine Number of less than about 0.5.

5. A composition according to claim 1 in which at least 80% of the total carboxyl equivalent of said polycarboxylic acid material are provided by said saturated trimer acid.

6. A composition according to claim 1 in which said saturated dimers and trimers are formed from a $C_{18}$ unsaturated fatty acid.

7. A composition according to claim 1 in which said polycarboxylic acid material is a carboxyl-terminated polyester of said saturated dimer acid and a diol containing 4 to 20 carbon atoms.

8. A composition according to claim 7 in which said saturated dimer is a branched chain, $C_{36}$ dimer of a $C_{18}$ unsaturated fatty acid and said diol is 1,10-decanediol.

9. The cellular product of claim 1 wherein from 20% to 80% based on the equivalents of said acid material is replaced with a diaziridine.

10. A composition according to claim 1 in which the cured reaction product is in the form of a stable flexible foam having a uniform cell structure.

11. A composition according to claim 10 in which said foam has a density of from about 0.1 to about 0.3 g./cc.

12. A composition according to claim 11 in which said foam is stable at temperatures up to 135° C.

References Cited

UNITED STATES PATENTS

| | | | |
|---|---|---|---|
| 2,577,280 | 12/1951 | Simon et al. | 260—2.5 |
| 3,068,254 | 12/1962 | LeBras et al. | 260—407 |
| 3,222,394 | 12/1965 | Rowland et al. | 260—515 |
| 3,431,223 | 3/1969 | Reymore et al. | 260—2.5 |

FOREIGN PATENTS

| | | | |
|---|---|---|---|
| 576,492 | 5/1959 | Canada | 260—2.5 |
| 714,110 | 7/1965 | Canada | 260—2.5 |
| 977,705 | 12/1964 | Great Britain | 260—2.5 |

DONALD E. CZAJA, Primary Examiner

C. W. IVY, Assistant Examiner